(12) United States Patent
Klosa et al.

(10) Patent No.: US 6,751,689 B2
(45) Date of Patent: Jun. 15, 2004

(54) INTERFACE CIRCUIT AND METHOD FOR TRANSMITTING DATA BETWEEN A SERIAL INTERFACE AND A PROCESSOR

(75) Inventors: Klaus Klosa, München (DE); Harald Hofmann, Fürth (DE)

(73) Assignee: Infineon Technologies AG, Munich (DE)

(*) Notice: Subject to any disclaimer, the term of this patent is extended or adjusted under 35 U.S.C. 154(b) by 432 days.

(21) Appl. No.: 09/776,953
(22) Filed: Feb. 5, 2001

(65) Prior Publication Data
US 2001/0012326 A1 Aug. 9, 2001

Related U.S. Application Data

(63) Continuation of application No. PCT/DE99/05679, filed on Aug. 5, 1999.

(30) Foreign Application Priority Data
Aug. 5, 1998 (EP) .............................................. 98114750

(51) Int. Cl.⁷ .......................... G06F 13/00; H04L 23/00
(52) U.S. Cl. ............................ 710/71; 710/52; 710/53; 710/57; 375/377
(58) Field of Search ............................. 710/52, 53, 57, 710/71; 375/377

(56) References Cited

U.S. PATENT DOCUMENTS 5,521,590 A * 5/1996 Hanaoka et al. ......... 340/10.51
5,713,028 A     1/1998 Takahashi et al.
5,717,870 A * 2/1998 Dobson ..................... 709/250
5,781,599 A     7/1998 Shiga
6,201,817 B1 * 3/2001 Sullivan ..................... 370/463
6,295,572 B1    9/2001 Wu

FOREIGN PATENT DOCUMENTS

| | | |
|---|---|---|
| EP | 0 290 172 A2 | 11/1988 |
| EP | 0 312 238 A2 | 4/1989 |
| EP | 0 357 361 B1 | 3/1990 |
| EP | 0 364 720 A1 | 4/1990 |
| EP | 0 562 746 A1 | 9/1993 |
| JP | 06 052 052 A | 2/1994 |
| JP | 06 110 798 A | 4/1994 |
| JP | 7 271 703 | 7/1995 |
| JP | 08 097 837 | 4/1996 |
| JP | 08 202 469 A | 8/1996 |
| JP | 08 314 851 A | 11/1996 |
| JP | 10 063 617 A | 3/1998 |
| KR | 1998-024444 | 7/1998 |
| RU | 2 047 920 C1 | 11/1995 |

* cited by examiner

Primary Examiner—Jeffrey Gaffin
Assistant Examiner—Tammara Peyton
(74) Attorney, Agent, or Firm—Laurence A. Greenberg; Werner H. Stemer; Gregory L. Mayback

(57) ABSTRACT

An interface circuit transmits data via a serial interface to and from a processor. A first-in-first-out memory is disposed between the serial interface and the processor. A suitable method transmits data which are received and read into the memory serially bit by bit and are read out of it byte by byte by the processor, or, respectively, can be written byte by byte into the memory by the processor and can be transmitted from the memory bit by bit.

30 Claims, 4 Drawing Sheets

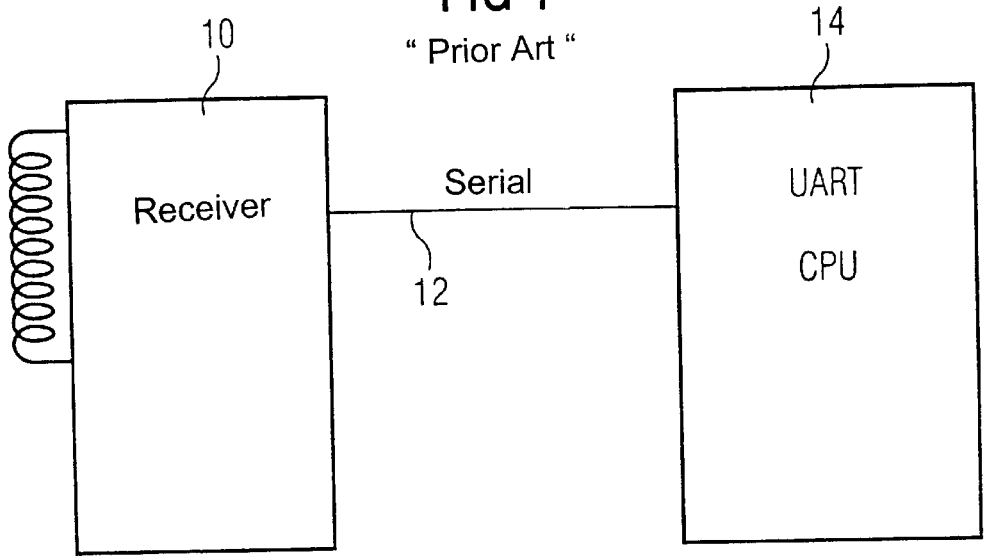
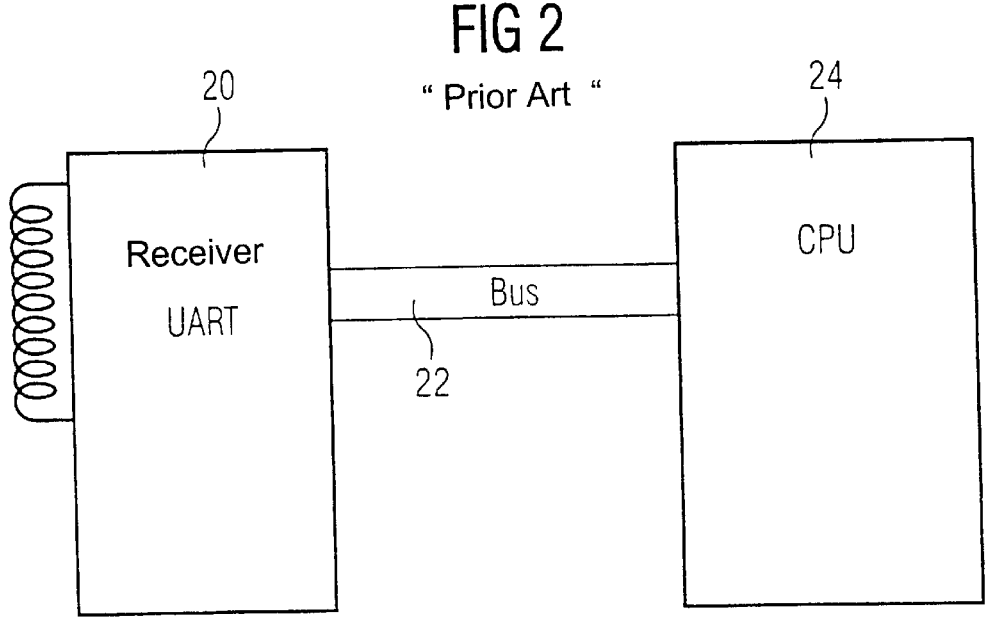

INTERFACE CIRCUIT AND METHOD FOR TRANSMITTING DATA BETWEEN A SERIAL INTERFACE AND A PROCESSOR

CROSS-REFERENCE TO RELATED APPLICATION

This application is a continuation of copending International Application No. PCT/EP99/05679, filed Aug. 5, 1999, which designated the United States.

BACKGROUND OF THE INVENTION

FIELD OF THE INVENTION

The present invention relates to an interface circuit for transmitting data via serial interface from and to a processor and a method for transmitting data between a serial interface and a processor.

The present invention is intended for serial, especially wireless data transmission to a processor that is arranged, for example, on a chip card. The present invention is particularly suitable for wireless data transmission between a card reader and a contactless chip card having a processor.

In these applications, the load is to be removed from the processor so that a processor can be used which is clocked slowly. This is intended to reduce the current consumption (the current consumption is proportional to the clock frequency in the processors currently used). In addition, it is intended to switch the processor to the so-called sleep or standby mode, in which the processor is not operating and thus consumes much less current, as often as possible and as long as possible.

According to the current state of the art, data is transmitted between a serial interface and a processor by a parallel/serial or, respectively, serial/parallel conversion via a so-called universal asynchronous receiver/transmitter (UART). This is usually implemented by a shift register at the end at which, for example, the transceiver for a wireless transmission is connected. This shift register can be loaded bit by bit (during reception) or, respectively, read bit by bit (during transmission). At the other end of the UART, the processor must fetch the data from the UART or, respectively, provide them to it in parallel and synchronously in time with the data transmission protocol used (see FIGS. 1 and 2). This makes very high demands on the real-time capability of the processor. Such high demands on the real-time capability of the processor are in contradiction with the demand that the processor should consume as little current as possible and should be as inexpensive as possible. Especially in the case of contactless chip cards, processors can be used that are as simple as possible and are clocked as slowly as possible and, therefore, consume very little current and are very inexpensive. However, such processors cannot meet the abovementioned real-time requirements.

In the prior art, a method is, therefore, currently used for contactless chip cards in which the serial information is fetched from the connection of the serial interface or, respectively, written to the connection of the serial interface bit by bit by the processor. However, this task ties up a great amount of computing time of the processor so that, in turn, it becomes necessary to use a faster processor.

SUMMARY OF THE INVENTION

It is accordingly an object of the invention to provide an interface circuit and method for transmitting data between a serial interface and a processor that overcomes the hereinafore-mentioned disadvantages of the heretofore-known devices of this general type and that specifies an interface circuit for transmitting data via a serial interface from and to a processor, in which the data transmission can run without loading the processor. It is also an object of the invention to specify a suitable method for transmitting data between a serial interface and a processor.

With the foregoing and other objects in view, there is provided, in accordance with the invention, an interface circuit for transmitting data via a serial interface to and from a processor. The interface circuit includes only one memory for a number of word lengths disposed between a serial interface and a processor. The memory is written to and read from word by word or bit by bit.

With the objects of the invention in view, there is also provided a method for transmitting data between a serial interface and a processor. The method includes writing received data from a serial interface into a memory bit by bit, reading the received data byte by byte from the memory to a processor, writing received data from a processor into a memory byte by byte, and reading the received data bit by bit from the memory to a serial interface.

According to the invention, this object is achieved by an interface circuit in which a memory for a number of bus or processor word lengths (e.g. bytes) is arranged between the serial interface and the processor.

The object is also achieved by a method in which the data are received serially bit by bit and are read into a memory and there are read out again byte by byte by the processor or, respectively, are written into the memory byte by byte by the processor and are transmitted byte by byte from the memory.

In this arrangement, it is especially preferred if the memory can be written to and read out word by word or bit by bit. To this end, it is especially preferred if the memory has a write pointer and a read pointer that can individually address each bit or each word (e.g. byte).

To save more current, it is advantageous if the processor has a current saving mode (sleep mode or standby mode) with minimum current consumption.

It is also advantageous to build a comparator into the memory. This removes further load from the processor.

The comparator can preferably comprise a simple logic unit that automatically compares each received bit with the content of the memory cell to which the received bit is to be written.

To further simplify the circuit, the memory can be integrated in the CPU module or in the receiver module. A further simplification of the circuit is also possible by implementing the memory by means of RAM cells from the normal RAM in the address area of the processor.

To remove further load from the processor, a checksum module can be provided in addition to the memory. In addition to the checksum module, a comparator can also be provided which compares the checksum of the received data with an expected precalculated checksum. This makes it possible to remove further load from the processor.

The memory preferably can be implemented in the form of a ring structure and/or provided with an overflow detection device that activates (wakes up) the processor in the event of an impending overflow of the memory. This makes it possible to prevent losses of data resulting from overwriting in the memory.

In the method according to the invention, it can be preferably provided, to remove load from the processor, that the write pointer and read pointer of the memory can be automatically set without the processor becoming active.

A method in which the processor can freely set the write pointer and read pointer of the memory provides much greater flexibility in the programming.

Even greater programming flexibility is provided by the method in which the processor treats the individual memory cells of the memory as components of its own address area and can thus optionally read and write to these cells.

Further load can be removed from the processor in that an automatic data comparison is provided in which the data to be expected must be stored at the corresponding place in the memory and each received bit is compared by a simple logic unit with the content of the memory cell in the memory to which it is written.

In this arrangement, the write pointer of the memory can provide both the addressing of the expected bit, with which the comparison is to be made, and the addressing of the received bit that is now to be written into the memory. This provides a simplification of the programming and of the circuit configuration.

In this arrangement, after the comparison of all bits of a byte, a bit associated with this byte can be preferably set to 0 if all bits were equal and is set to 1 if not. It is especially preferred in this arrangement if the associated bits can be accessed byte by byte by the processor. A newly received bit sequence can be evaluated rapidly and simply by masking out comparison information.

During this process, the processor can also preferably be switched to a current saving mode (sleep mode or standby mode) during the data transmission. It is then especially preferred if the processor is activated (woken up) in the event of an impending overflow of the memory.

Instead of the relatively elaborate comparison of the individual bits, an automatic data comparison also can be provided in which a checksum of the received data is automatically compared with a precalculated checksum of the data to be expected.

This makes it possible to remove further load from the processor in that comparisons, e.g. of the serial number of the contactless chip card, can take place automatically and without support by the processor during the data reception.

The present invention also can be used for processing protocols that allow the transmission of fractions of a byte (e.g. only 3 bits).

Neither the use of multi-word memories in the serial interface of chip cards nor the use of such automatic comparison circuits and methods in combination with a CPU has been previously known.

Other features which are considered as characteristic for the invention are set forth in the appended claims.

Although the invention is illustrated and described herein as embodied in an interface circuit and method for transmitting data between a serial interface and a processor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic showing the prior art with serial transmission between receiver module and processor module;

FIG. 2 is a schematic showing the prior art with connection of the receiver module to the CPU bus.

DESCRIPTION OF THE PREFERRED EMBODIMENTS

Figure 3:
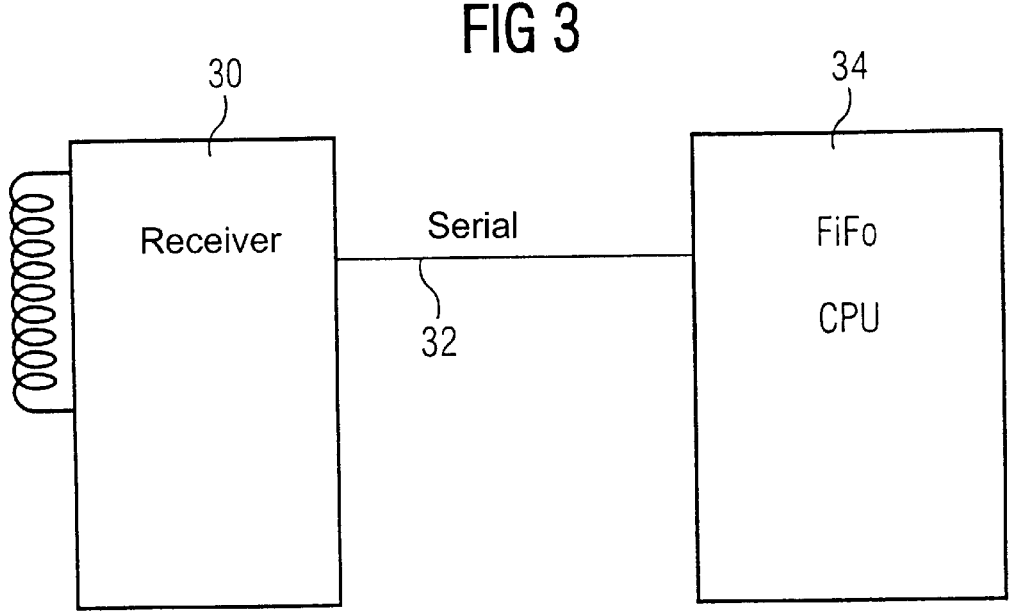
FIG. 3 is a schematic showing serial transmission of the data between receiver module and the processor module.

In all the figures of the drawing, sub-features and integral parts that correspond to one another bear the same reference symbol in each case.

Referring now to the figures of the drawings in detail and first, particularly to FIGS. 1 and 2 thereof, there is shown the prior art. Either the receiver 10 can be connected via a serial connection 12 to the processor module 14, on which a universal asynchronous receiver/transmitter (UART) circuit is then provided. Another solution of the prior art provides a receiver module 20 which itself carries the UART circuit and is then connected via the data bus 22 to the processor 24.

Figure 4:
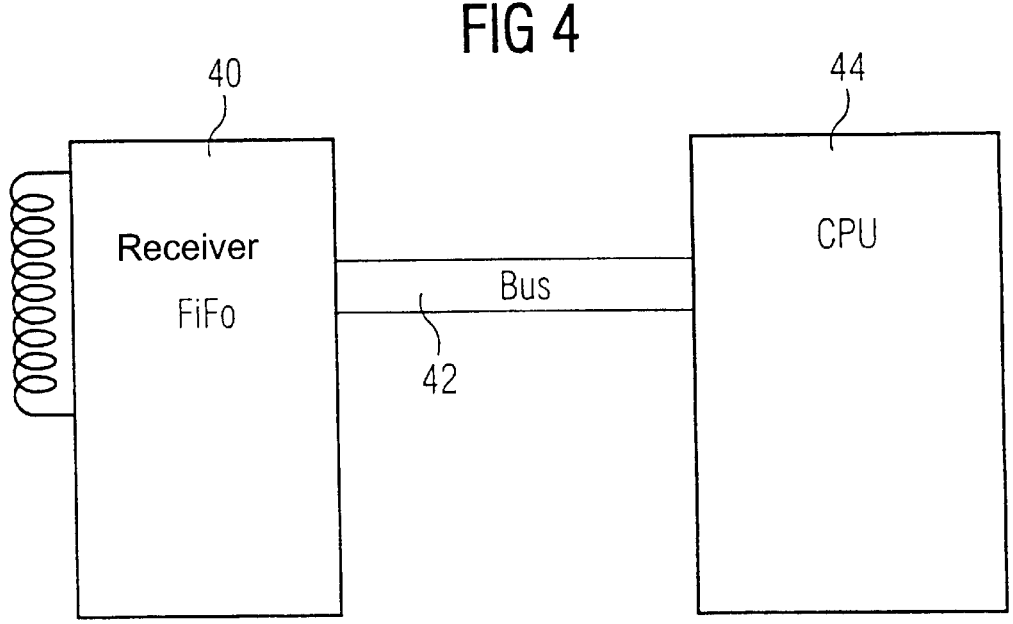
FIG. 4 is a schematic showing a connection of the receiver module to the processor bus.

FIGS. 3 and 4 show the solution according to the invention by comparison. In FIG. 3, a receiver module 30 with serial interface is again used. The receiver module 30 is connected to the processor module 34 via the serial connection 32. Instead of the UART circuit, however, a first-in-first-out (FiFo) memory is provided on the processor module 34. Thus, a first-in-first-out structure with, for example, thirty-two (32) bytes is used instead of the UART circuit. In the case of the reception of data, the data are written bit by bit into the first-in-first-out memory. As soon as a byte is filled, the next byte in the first-in-first-out memory is automatically filled bit by bit until the data block is finished. Transmission occurs analogously to the reception; i.e. the data is read bit by bit, byte after byte out of the first-in-first-out memory. Both the receiving process and the transmitting process can run independently of the processor (CPU). The processor can be preferably in a sleep mode or standby mode (a current saving mode with negligible current consumption) during this process. The processor can read the content of the first-in-first-out memory sequentially byte by byte or, respectively, write data into it sequentially byte by byte. Using a write pointer and a read pointer, it is possible to address each bit individually in the first-in-first-out memory. As a result, it is also possible to transmit or receive incomplete bytes, for example only 3 bits. At the same time, the requirements on the real-time capability of the processor are much lower than in the solution according to the prior art with UART circuit.

As an alternative to a first-in-first-out memory, a last-in-first-out (LiFo) can also be used. In this arrangement, only the order of the received and transmitted data is reversed. This can be taken into consideration, or even desirable, in the programming. Naturally, the discussion following can be applied analogously to a last-in-first-out memory.

The first-in-first-out memory is thus integrated into the CPU module in the present embodiment according to FIG.

3. The first-in-first-out memory can even be implemented using RAM cells from the normal RAM user memory in the address area of the processor (for example in the internal RAM). As a result, no additional memory circuits are required.

FIG. 4 shows a further embodiment of the invention. In this arrangement, the first-in-first-out memory is integrated in the receiver module 40. This is then connected to the processor module 44 via the processor data bus 42.

Both in the embodiment of the invention according to FIG. 3 and in the embodiment according to FIG. 4, the first-in-first-out memory may only be written to and read sequentially by the processor (CPU). This prevents any random access of the processor to the first-in-first-out memory. This considerably contributes to data security if an application must be prevented from attempting to change the data of another application.

However, much more flexible programming is possible if the processor can set freely the write pointer and read pointer of the first-in-first-out memory. This enables it to influence both the position (accurate to the bit) at which the processor reads or writes in parallel and the position (accurate to the bit) at which the wireless interface writes or reads serially.

A further increase in the flexibility of the access is allowed by the processor considering the individual bits of the first-in-first-out memory as components of its logical address area and being able to write to them or reading them randomly and independently of the write pointers or read pointers, respectively. This solution is particularly suitable in connection with the implementation of the first-in-first-out memory by means of physical RAM cells from the normal user memory of the processor.

In each of the embodiments of the first-in-first-out memory described, a comparison circuit in the first-in-first-out memory or an automatic checksum check can be additionally provided.

In addition to the first-in-first-out memory, a UART circuit according to the prior art can also be provided in order to be able to process, for example, long protocols (for example forty-byte (40-byte) protocols in the case of a thirty-two-byte (32-byte) first-in-first-out memory) in conventional manner.

It is especially preferred to organize the first-in-first-out memory in the form of a ring structure. The processor can then be activated (woken up) in the event of an impending overflow of the first-in-first-out memory so that it processes data from the first-in-first-out memory.

If needed, the first-in-first-out memory can also be operated like a "traditional" UART circuit of the prior art.

Naturally, the first-in-first-out memory can also be implemented with processors without current saving mode.

Figure 5:
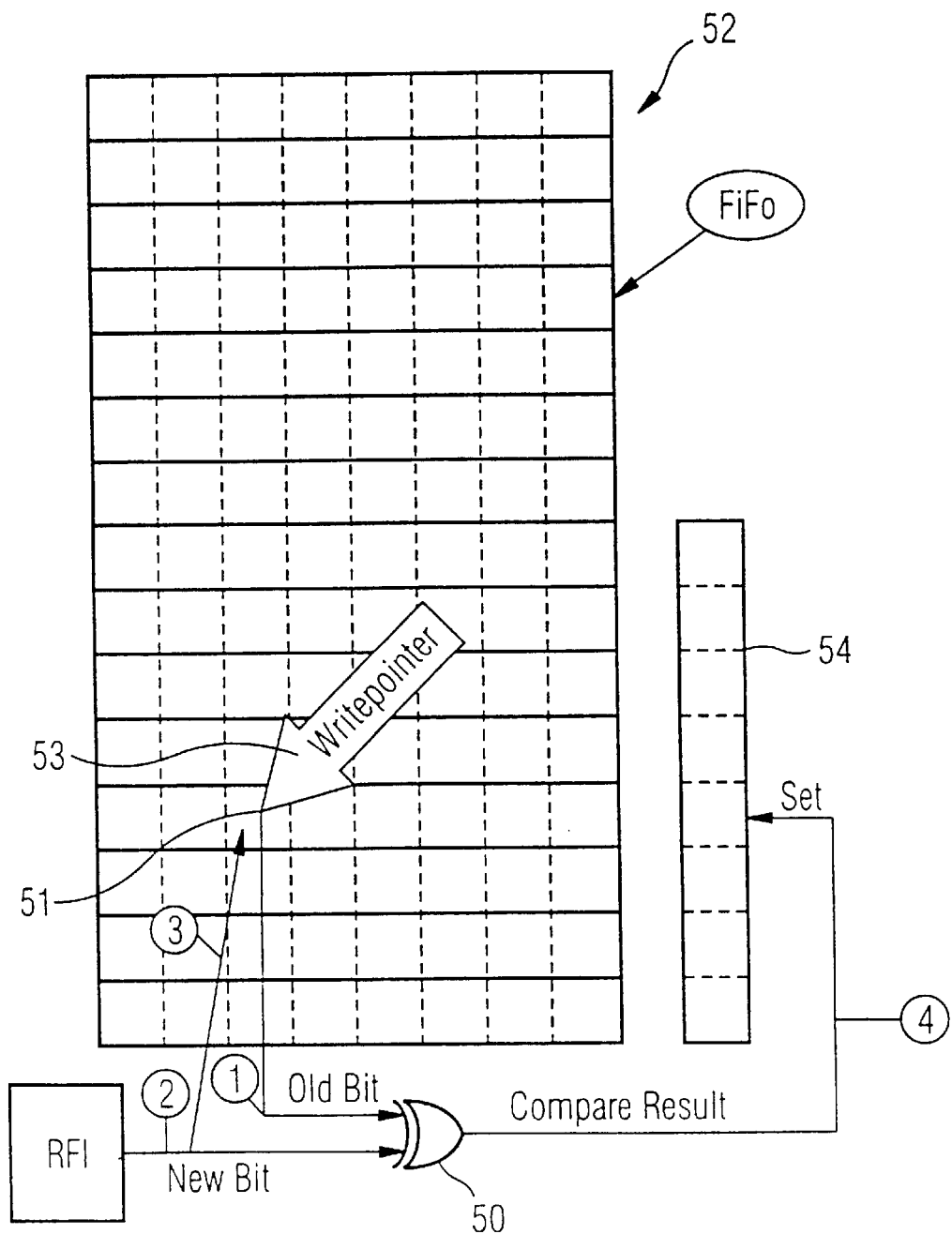
FIG. 5 is a schematic showing a FiFo memory with comparison circuit for checking the correctness of the expected data.

To remove additional load from the processor, an automatic comparator can be implemented in the interface circuit. This relieves the processor of the task of comparing received data with expected data (for example for authentication purposes). According to the invention, these tasks are handled by a first-in-first-out memory with inbuilt comparator, as is shown in FIG. 5. This makes it possible to further reduce the power demands on the processor and thus the current consumption. It may also be possible to use a more inexpensive processor.

The comparison circuit shown in FIG. 5 needs the expected data, for example a serial number or a password, in the first-in-first-out memory. A simple logic unit 50 automatically compares each received bit (new bit, 2) with the content of the memory cell 41 in the first-in-first-out memory 52 to which it is to be written. The write pointer 53 is thus used both for addressing the expected bit 1 with which the comparison is to be made, and for addressing the write position of the received bit 2 that is now to be written into the first-in-first-out memory 3. The new bits are supplied by the transmitting/receiving unit RFI (radio frequency interface).

Once all bits of a byte have been compared and written into the first-in-first-out memory 52, if all bits were equal, a bit associated with this byte is set to 0 in a special comparison register 54, and if not, this bit is set to one (1). The operation is as follows, namely that the register 54 is set to zero (0) before the beginning of the comparison operation and the logic unit 50 sets the corresponding memory cell of the register 54 to one (1) as soon as the state old bit does not equal ($\neq$) the new bit occurs once. The process then continues bit by bit with the following byte until the data block is processed. The content of the register 54 (that is, the comparison information) can be accessed byte by byte by the processor. A newly received bit sequence can be evaluated rapidly and simply by masking out comparison information.

Incidentally, this comparison circuit also can be used in connection with a UART circuit according to the prior art. This also makes it possible to implement an automatic comparator without first-in-first-out memory.

Figure 6:
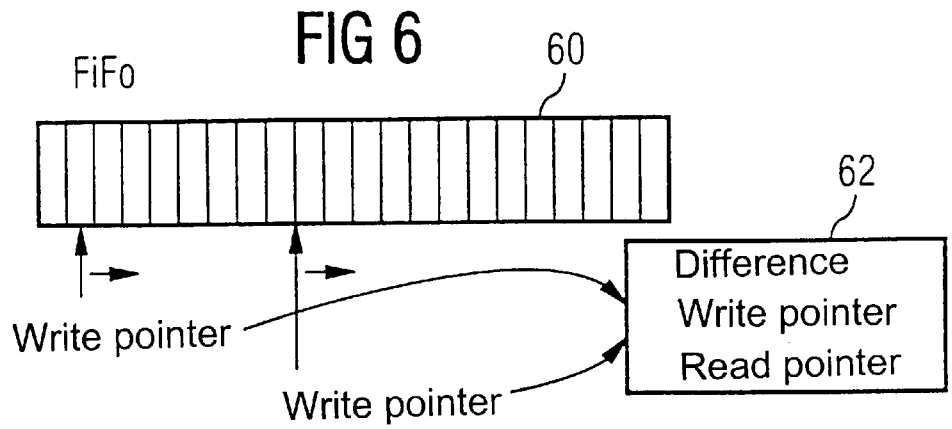
FIG. 6 is a schematic representing the first-in-first-out memory.

The basic operation of a first-in-first-out memory is shown in FIG. 6. The first-in-first-out memory consists of a series of memory cells that are cyclically addressed by a read pointer and a write pointer. When the first-in-first-out memory is written to, the value to be written is written to the position to which the write pointer is pointing and the write pointer is incremented by one position. During reading, a check is made that the write pointer is not equal to the read pointer. Then, the value of the memory cell to which the read pointer has pointed is read out and the read pointer is incremented. If write pointer is equal to read pointer, the first-in-first-out memory is empty. This is detected by a corresponding difference circuit 62. The memory then returns either the value zero (0) or the message that reading is not possible. Because the difference circuit 62 thus always specifies the number of bits in the first-in-first-out memory, this circuit also can be used to activate the processor before any overflow of the first-in-first-out memory and to initiate the processing of data so that space is again created in the first-in-first-out memory.

Figure 7:
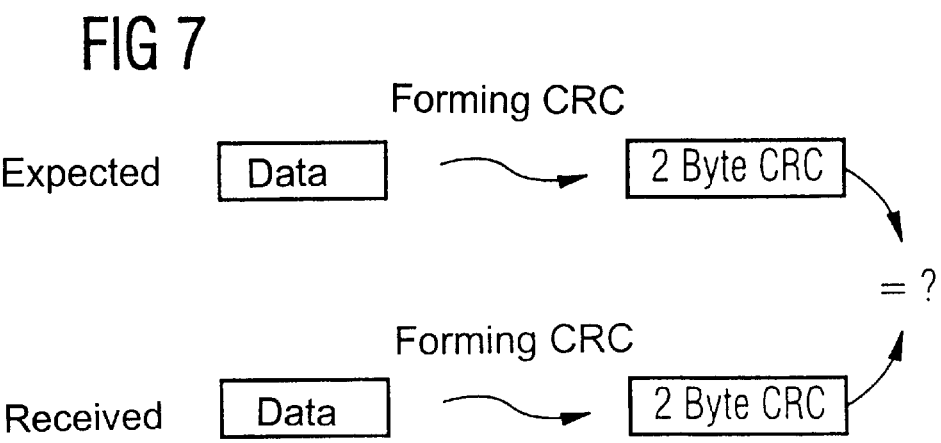
FIG. 7 is a schematic depicting a data comparison about forming a checksum.
Figure 8:
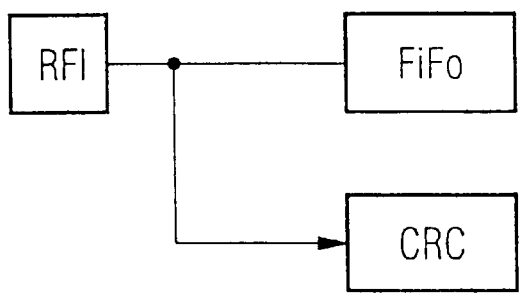
FIG. 8 is a schematic illustrating the forming of the checksum in parallel with the loading of the data into the first-in-first-out memory.

Another possibility according to the invention for the data comparison consists in automatically generating a checksum of the received data, for example in accordance with the CRC method, which is compared with a checksum, calculated in advance (for example during the initialization), of the data to be expected. However, this method is not as efficient as the comparator in the first-in-first-out memory as described in FIG. 5 because the checksums of the received data and the expected data must be compared by the processor. Thus, this embodiment again places a load on the processor. Moreover, there must be one bit error per data block at the most so that it can be reliably detected. In addition, a logic unit must distinguish between data and instructions since otherwise the checksum of the received data may be formed via different instructions in the checksum of the expected data. This is shown in detail in FIGS. 7 and 8:

The CRC checksum is calculated from the expected data. It consists of two bytes. From the received data, the checksums are then formed, also in accordance with the CRC method. It is then only necessary to compare 2 byte-long CRC checksums and not all of the data. The comparison of these short CRC checksums of two bytes is much faster than the comparison of all the data. The checksum of the data to be expected can even be calculated long before. As shown in FIG. 8, it is also possible to enter the received data simultaneously into the first-in-first-out memory and into a checksum logic unit. This logic unit generates the checksums in real time so that the processor now only needs to perform the checksum comparison, which needs little computing time, in real time.

In this manner, considerable load can be removed from the processor by adding a first-in-first-out memory and possibly a comparator or a checksum generator that automatically forms a checksum over the received data, in comparison with the usual UART concept. As a result, the frequency and thus the current consumption of the processor can be lower. In the case of a contactless chip card, a lower current consumption means, in particular, a greater range.

It is especially preferred to use a processor which can be placed into a current saving mode during the transmission, reception or as long as it is not busy. The processor can then be switched to the current saving mode, for example when it is finished with the preparation for transmitting/receiving, until the transmitting/receiving is complete. The energy otherwise needed by the processor can then be either saved or is available for the transmitting and receiving hardware. Moreover, no supply voltage spikes can flash over from the processor to the wirelessly transmitted signal during the transmitting and receiving operation. A lower current consumption and more advantageous energy distribution on the card chip and a more advantageous signal behavior result in greater range.

In addition, the transmitting function also can be triggered under timing control whilst the processor is in the current saving mode. Similarly, an "auto-receive function" can be implemented. In this mode, the system can automatically switch into receiving mode during the current saving mode of the processor without having to activate the processor.

We claim:

1. An interface circuit for transmitting data via a serial interface to and from a processor, comprising:
   only one memory for a number of word lengths disposed between a serial interface and a processor, said memory configured for being written to and read from word by word and bit by bit.

2. The interface circuit according to claim 1, wherein said word lengths are bus word lengths.

3. The interface circuit according to claim 1, wherein said word lengths are processor word lengths.

4. The interface circuit according to claim 1, wherein said memory is to be written to and read out word by word.

5. The interface circuit according to claim 4, wherein said memory includes:
   a write pointer for individually addressing each bit; and
   a read pointer that can individually address each bit.

6. The interface circuit according to claim 1, wherein said memory is to be written to and read out bit by bit.

7. The interface circuit according to claim 6, wherein said memory includes:
   a write pointer for addressing individually each word; and
   a read pointer for addressing individually each word.

8. The interface circuit according to claim 1, wherein the processor has a current saving mode with minimum current consumption.

9. The interface circuit according to claim 1, wherein said memory includes:
   a built-in comparator.

10. The interface circuit according to claim 9, wherein said memory includes memory cells storing content and said comparator includes a simple logic unit automatically comparing each received bit with the content of the memory cell to which the received bit is to be written.

11. The interface circuit according to claim 1, wherein said memory is integrated in the processor.

12. The interface circuit according to claims 1, wherein said memory is integrated in a receiver module.

13. The circuit according to claims 1, wherein the processor has an address area with normal RAM containing RAM cells, and the RAM cells form the normal RAM in the address area of the processor form said memory.

14. The interface circuit according to claim 1, including:
   a checksum module.

15. The interface circuit according to claim 10, including:
   a comparator comparing the checksum of received data with an expected precalculated checksum.

16. The interface circuit according to claim 1, wherein said memory has a ring structure.

17. The interface circuit according to claim 1, wherein said memory includes an overflow detection device activating the processor before said memory overflows.

18. A method for transmitting data between a serial interface and a processor, which comprises:
   writing received data from a serial interface into a memory bit by bit;
   reading the received data byte by byte from the memory to a processor;
   writing received data from a processor into a memory byte by byte; and
   reading the received data bit by bit from the memory to a serial interface.

19. The method according to claim 18, which further comprises:
   setting automatically write pointers and read pointers of the memory without load on the processor to write received data from a processor and to read received data to the processor sequentially.

20. The method according to claim 18, which further comprises:
   setting freely a write pointer and a read pointer of the memory with the processor.

21. The method according to claim 18, wherein the CPU has an address area, the memory includes memory cells, and the processor treats the individual memory cells of the memory as components of the address area; and the method includes:
   reading randomly to the memory cells by the processor; and
   writing randomly from the memory cells by the processor.

22. The method according to claims 18, which further comprises:
   storing the received data in a memory cell of the memory; and
   comparing the received data with the content of the memory cell in the memory to which the received data is written using a simple logic unit.

23. The method as claimed in claim 22, which further comprises:
   supplying with a write pointer of the memory both an addressing of an expected bit with which the comparison is to be made and the addressing of the received bit that is now to be written into the memory.

24. The method according to claim 22, which further comprises:

completing the comparison of every bit of a byte;

setting a bit associated with the byte to 0 if every bit of the byte was equal; and setting a bit associated with the byte to 1 if every bit was no equal.

25. The method according to claim 24, which further comprises:

accessing the associated bits byte by byte by the processor.

26. The method according to claims 18, which further comprises:

switching the processor to a current saving mode during data transmission.

27. The method according to claim 26, which further comprises:

activating the processor before the memory overflows.

28. The method according to claim 18, which further comprises:

comparing automatically a checksum of the received data with a precalculated checksum of the data to be expected.

29. The method according to claim 26, which further comprises:

controlling a timing of the transmitting of data from the memory without activating the processor.

30. The method according to claim 26, which further comprises:

switching automatically into receiving mode without activating the processor after the transmission of data.

* * * * *